United States Patent
Chen et al.

(10) Patent No.: US 12,490,240 B2
(45) Date of Patent: Dec. 2, 2025

(54) QUASI CO-LOCATION PRIORITIZATION RULES FOR MULTI-DOWNLINK CONTROL INFORMATION RECEPTION AND PHYSICAL DOWNLINK CONTROL CHANNEL REPETITION

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 17/934,542

(22) Filed: Sep. 22, 2022

(65) Prior Publication Data
US 2023/0106730 A1   Apr. 6, 2023

Related U.S. Application Data

(60) Provisional application No. 63/262,010, filed on Oct. 1, 2021.

(51) Int. Cl.
*H04W 72/02* (2009.01)
*H04W 24/08* (2009.01)
(Continued)

(52) U.S. Cl.
CPC ........... *H04W 72/02* (2013.01); *H04W 24/08* (2013.01); *H04W 72/0453* (2013.01); *H04W 72/23* (2023.01); *H04W 72/56* (2023.01)

(58) Field of Classification Search
CPC . H04W 72/02; H04W 24/08; H04W 72/0453; H04W 72/23; H04W 72/56;
(Continued)

(56) References Cited

U.S. PATENT DOCUMENTS

2021/0015750 A1* 1/2021 Worsham ........... A61K 31/4174
2021/0058906 A1* 2/2021 Seo ....................... H04B 7/0617
(Continued)

FOREIGN PATENT DOCUMENTS

EP       4344281 A1 *  3/2024  ............. H04L 1/189
WO  WO-2021011174 A1 *  1/2021  ............. H04W 72/23
(Continued)

OTHER PUBLICATIONS

LG Electronics: "Enhancements on Multi-TRP for PDCCH, PUCCH and PUSCH", 3GPP TSG RAN WG1 #106-e, R1-2107815, 3rd Generation Partnership Project, Mobile Competence Centre, 650, Route Des Lucioles, F-06921 Sophia-Antipolis Cedex, France, vol. RAN WG1, Aug. 7, 2021, XP05 (Year: 2021).*

(Continued)

*Primary Examiner* — Ayaz R Sheikh
*Assistant Examiner* — Louis Samara
(74) *Attorney, Agent, or Firm* — Paul M. McAdams; Harrity & Harrity, LLP

(57) ABSTRACT

Various aspects of the present disclosure generally relate to wireless communication. In some aspects, a user equipment (UE) may receive a configuration of physical downlink control channel (PDCCH) repetition and multi-downlink control information reception wherein, for at least one of a first or second control resource set (CORESET) pool index, a first monitoring occasion (MO) of a first linked search space set, associated with a first CORESET and having a first transmission configuration indicator (TCI) state, overlaps with a second MO of a second linked search space set associated with a second CORESET having a second TCI state. The UE may monitor PDCCH communications in the overlapping monitoring occasions based on a determination of a plurality of monitored CORESETs, wherein the determination is based on a first rule, a second rule, or a third rule, (Continued)

associated with a plurality of quasi co-location monitoring properties. Numerous other aspects are described.

30 Claims, 8 Drawing Sheets

(51) Int. Cl.
*H04W 72/0453* (2023.01)
*H04W 72/23* (2023.01)
*H04W 72/56* (2023.01)

(58) Field of Classification Search
CPC ..... H04L 5/001; H04L 5/0023; H04L 5/0094; H04L 5/0035; A61K 31/4174; H04B 7/0695
See application file for complete search history.

(56) References Cited

U.S. PATENT DOCUMENTS

| | | | |
|---|---|---|---|
| 2021/0105060 A1* | 4/2021 | Venugopal | H04L 5/005 |
| 2021/0105750 A1* | 4/2021 | Khoshnevisan | H04W 72/23 |
| 2022/0225319 A1* | 7/2022 | Khoshnevisan | H04W 72/0453 |
| 2023/0299918 A1* | 9/2023 | Song | H04L 5/0035 370/329 |
| 2024/0129933 A1* | 4/2024 | Matsumura | H04L 5/0094 |
| 2024/0163956 A1* | 5/2024 | Matsumura | H04W 72/0453 |

FOREIGN PATENT DOCUMENTS

| | | | | |
|---|---|---|---|---|
| WO | WO-2021161475 A1 * | 8/2021 | | H04L 5/0053 |
| WO | WO-2023000298 A1 * | 1/2023 | | H04L 5/0053 |

OTHER PUBLICATIONS

Mediatek Inc: "Enhancements on Multi-TRP for PDCCH, PUCCH and PUSCH", 3GPP TSG RAN WG1 #106e, R1-2107486, 3rd Generation Partnership Project, Mobile Competence Centre, 650, Route Des Lucioles, F-06921 Sophia-Antipolis Cedex, France, vol. RAN WG1, Aug. 7, 2021, XP05203 (Year: 2021).*
International Search Report and Written Opinion—PCT/US2022/076930—ISA/EPO—Jan. 4, 2023.
LG Electronics: "Enhancements on Multi-TRP for PDCCH, PUCCH and PUSCH", 3GPP TSG RAN WG1 #106-e, R1-2107815, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, XP052038686, pp. 1-9, Section 2.1.
Mediatek Inc: "Enhancements on Multi-TRP for PDCCH, PUCCH and PUSCH", 3GPP TSG RAN WG1 #106e, R1-2107486, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, XP052038401, 13 Pages, Section 2.1, Figures 1-2.
Moderator (Qualcomm): "Summary #1 of Email Discussions [106-e-NR-feMIM0-03] for mTRP PDCCH Enhancements", 3GPP TSG-RAN WG1 Meeting #106-e, R1-2108254, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 16, 2021, XP052042084, 74 Pages, The Whole Document.

* cited by examiner

QUASI CO-LOCATION PRIORITIZATION RULES FOR MULTI-DOWNLINK CONTROL INFORMATION RECEPTION AND PHYSICAL DOWNLINK CONTROL CHANNEL REPETITION

CROSS-REFERENCE TO RELATED APPLICATION

This Patent Application claims priority to U.S. Provisional Patent Application No. 63/262,010, filed on Oct. 1, 2021, entitled "QUASI CO-LOCATION PRIORITIZATION RULES FOR MULTI-DOWNLINK CONTROL INFORMATION RECEPTION AND PHYSICAL DOWNLINK CONTROL CHANNEL REPETITION," and assigned to the assignee hereof. The disclosure of this prior Application is considered part of and is incorporated by reference into this Patent Application in its entirety.

FIELD OF THE DISCLOSURE

Aspects of the present disclosure generally relate to wireless communication and to techniques and apparatuses for quasi co-location prioritization rules for multi-downlink control information reception and physical downlink control channel repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration that configures physical downlink control channel (PDCCH) repetition and multiple downlink control information (multi-DCI) reception wherein, for at least one control resource set (CORESET) pool index, a first monitoring occasion of a first linked search space set, associated with a first CORESET and having a first transmission configuration indicator (TCI) state, overlaps with a second monitoring occasion of a second linked search space set associated with a second CORESET having a second TCI state, wherein the at least one CORESET pool index comprises at least one of a first CORESET pool index or a second CORESET pool index. The method may include monitoring PDCCH communications in a set of overlapping monitoring occasions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of quasi co-location (QCL) monitoring properties, a second rule associated with the plurality of QCL monitoring properties, or a third rule associated with the plurality of QCL monitoring properties.

Some aspects described herein relate to a UE for wireless communication. The UE may include a memory and one or more processors coupled to the memory. The one or more processors may be configured to receive a configuration that configures PDCCH repetition and multi-DCI reception wherein, for at least one CORESET pool index, a first monitoring occasion of a first linked search space set, associated with a first CORESET and having a first TCI state, overlaps with a second monitoring occasion of a second linked search space set associated with a second CORESET having a second TCI state, wherein the at least one CORESET pool index comprises at least one of a first CORESET pool index or a second CORESET pool index. The one or more processors may be configured to monitor PDCCH communications in a set of overlapping monitoring occasions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of QCL monitoring properties, a second rule associated with the plurality of QCL monitoring properties, or a third rule associated with the plurality of QCL monitoring properties.

Some aspects described herein relate to a non-transitory computer-readable medium that stores a set of instructions for wireless communication by a UE. The set of instructions, when executed by one or more processors of the UE, may cause the UE to receive a configuration that configures PDCCH repetition and multi-DCI reception wherein, for at least one CORESET pool index, a first monitoring occasion of a first linked search space set, associated with a first CORESET and having a first TCI state, overlaps with a second monitoring occasion of a second linked search space set associated with a second CORESET having a second TCI state, wherein the at least one CORESET pool index comprises at least one of a first CORESET pool index or a second CORESET pool index. The set of instructions, when executed by one or more processors of the UE, may cause the UE to monitor PDCCH communications in a set of overlapping monitoring occasions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of QCL monitoring properties, a second rule associated with the plurality of QCL monitoring properties, or a third rule associated with the plurality of QCL monitoring properties.

Some aspects described herein relate to an apparatus for wireless communication. The apparatus may include means for receiving a configuration that configures PDCCH repetition and multi-DCI reception wherein, for at least one CORESET pool index, a first monitoring occasion of a first linked search space set, associated with a first CORESET and having a first TCI state, overlaps with a second monitoring occasion of a second linked search space set associated with a second CORESET having a second TCI state, wherein the at least one CORESET pool index comprises at least one of a first CORESET pool index or a second CORESET pool index. The apparatus may include means for monitoring PDCCH communications in a set of overlapping monitoring occasions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of QCL monitoring properties, a second rule associated with the plurality of QCL monitoring properties, or a third rule associated with the plurality of QCL monitoring properties.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
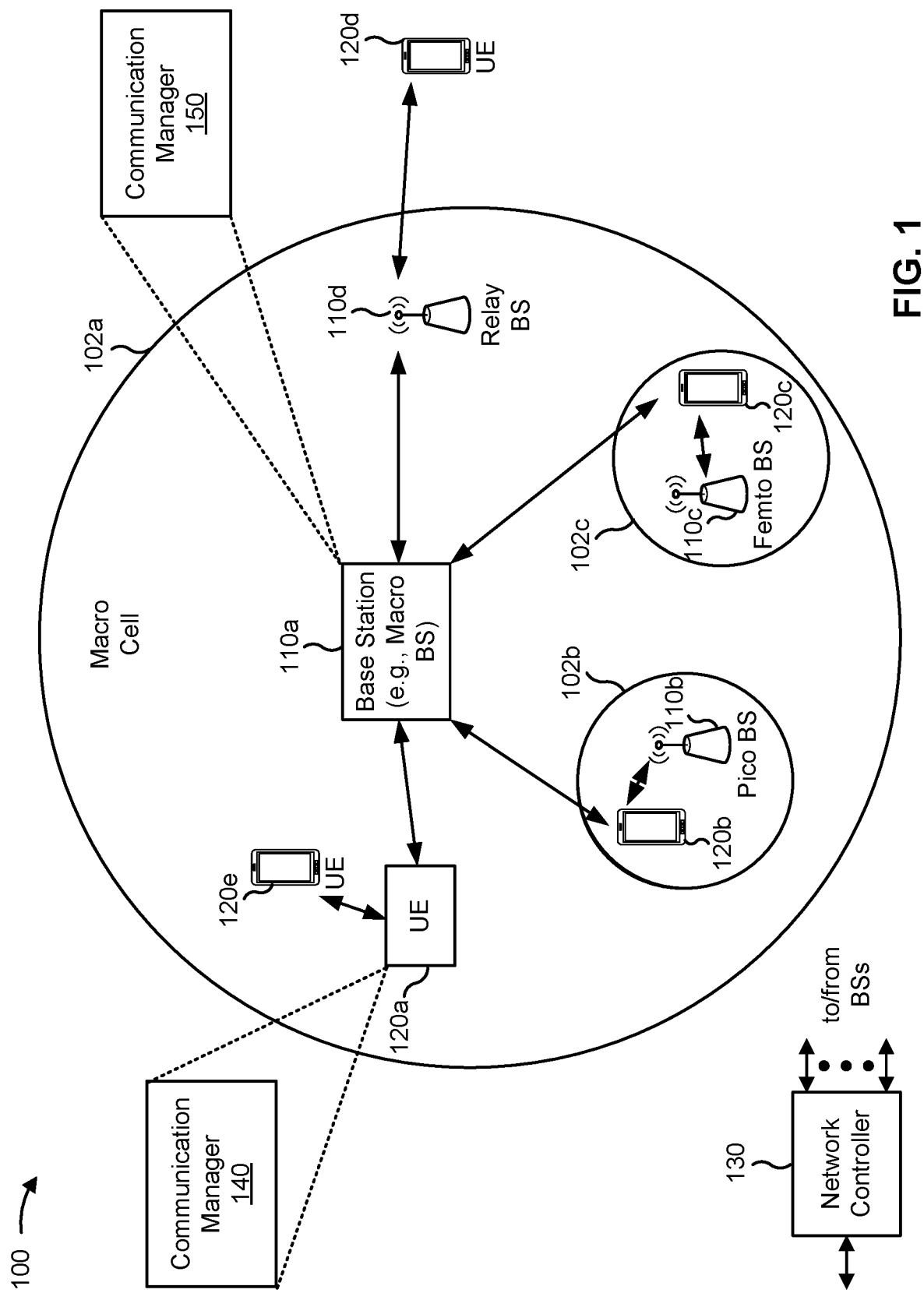
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration that configures physical downlink control channel (PDCCH) repetition and multiple downlink control information (multi-DCI) reception wherein, for at least one control resource set (CORESET) pool index, a first monitoring occasion of a first linked search space set, associated with a first CORESET and having a first transmission configuration indicator (TCI) state, overlaps with a second monitoring occasion of a second linked search space set associated with a second CORESET having a second TCI state, wherein the at least one CORESET pool index comprises at least one of a first CORESET pool index or a second CORESET pool index; and monitor PDCCH communications in a set of overlapping monitoring occasions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of quasi co-location (QCL) monitoring properties, a second rule associated with the plurality of QCL monitoring properties, or a third rule associated with the plurality of QCL monitoring properties. Additionally, or alternatively, the communication manager 140 may perform one or more other operations described herein.

In some aspects, the base station 110 may include a communication manager 150. The communication manager 150 may facilitate and/or perform any number of communication tasks including, for example, generating configurations (e.g., RRC configurations), allocating resources, and/or managing the operations of one or more components of the base station 110.

As indicated above, FIG. 1 is provided as an example. Other examples may differ from what is described with regard to FIG. 1.

Figure 2:
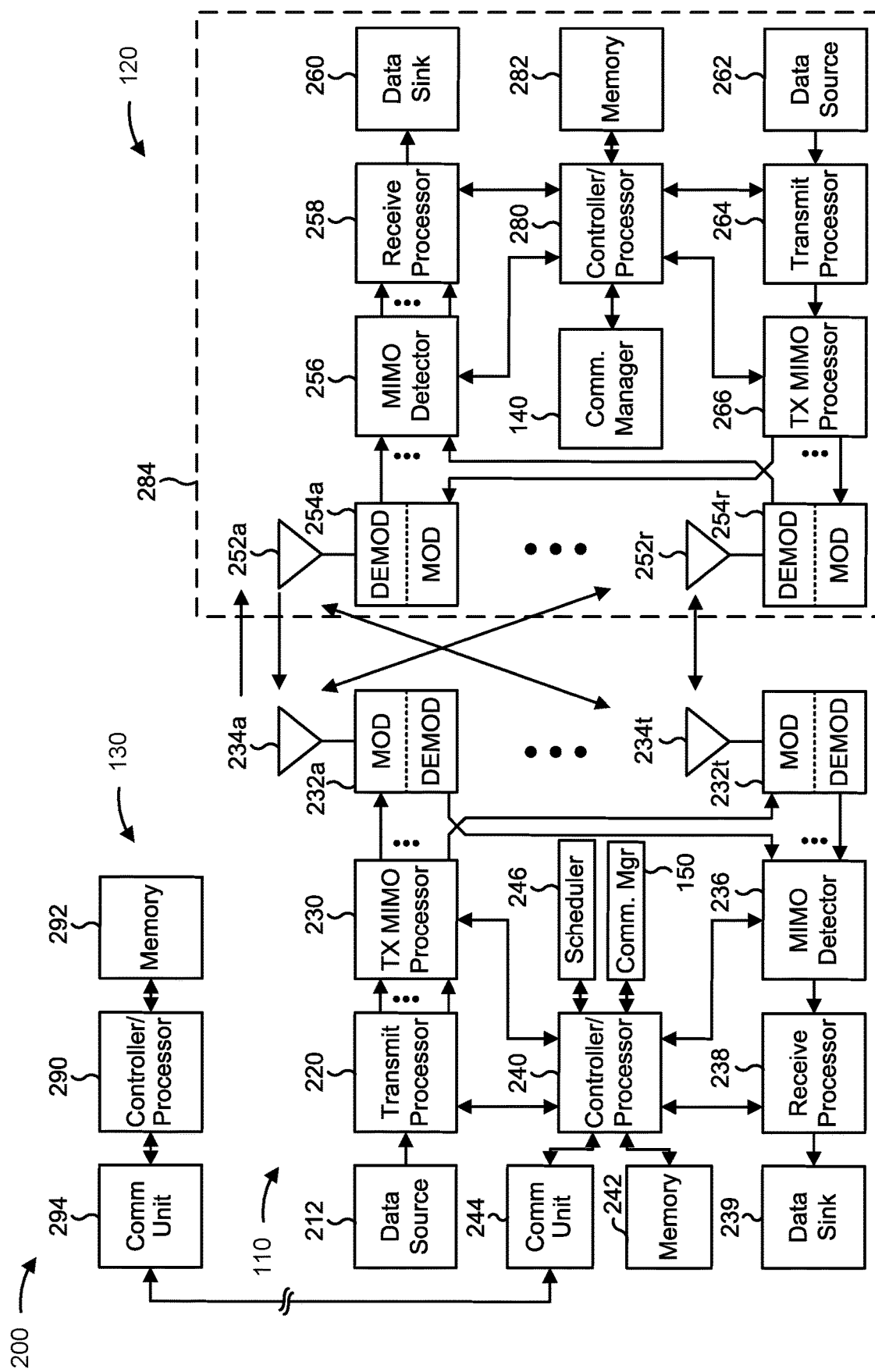
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving RF signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of TCI states that respectively indicate beams that may be used by the UE, such as for receiving a physical downlink shared channel (PDSCH). The base station may indicate an activated TCI state to the UE, which the UE may use to select a beam for receiving the PDSCH.

A downlink beam, such as a base station transmit beam or a UE receive beam, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each base station transmit beam may be associated with a synchronization signal block (SSB), and a UE may indicate a preferred base station transmit beam by transmitting uplink transmissions in resources of the SSB that are associated with the preferred base station transmit beam. A particular SSB may have an associated TCI state (for example, for an antenna port or for beamforming). The base station may, in some examples, indicate a downlink base station transmit beam based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam at the UE. Thus, a UE may select a corresponding UE receive beam at least in part on the base station indicating a base station transmit beam via a TCI indication. An uplink beam, such as a UE transmit beam or a base station receive beam, may be associated with a spatial relation. A spatial relation may indicate a directionality or a characteristic of the uplink beam, similar to one or more QCL properties, as described above.

A beam indication is an indication of a beam. A beam indication may be, or include, a TCI state information element, a beam identifier (ID), spatial relation information, a TCI state ID, a close loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a QCL type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) DCI to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, the network may support common TCI state ID update and activation to provide common QCL information and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

Some UEs and/or base stations may support full duplex operation in which the UEs and/or the base stations support full duplex operations. For example, a UE may support transmission via a first beam (e.g., using a first antenna panel) and may simultaneously support reception via a second beam (e.g., using a second antenna panel). Support for simultaneous transmission and reception may be conditional on beam separation, such as spatial separation (e.g., using different beams), frequency separation, and/or the like. Additionally, or alternatively, support for simultaneous transmission may be conditional on using beamforming (e.g., in frequency range 2 (FR2), in frequency range 4 (FR4), for millimeter wave signals, and/or the like).

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with QCL prioritization rules for multi-DCI reception and PDCCH repetition, as described in more detail elsewhere herein. In some aspects, the TRP described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the UE includes means for receiving a configuration that configures PDCCH repetition and multi-DCI reception wherein, for at least one CORESET pool index, a first monitoring occasion of a first linked search space set, associated with a first CORESET and having a first TCI state, overlaps with a second monitoring occasion of a second linked search space set associated with a second CORESET having a second TCI state, wherein the at least one CORESET pool index comprises at least one of a first CORESET pool index or a second CORESET pool index; and/or means for monitoring PDCCH communications in a set of overlapping monitoring occasions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of QCL monitoring properties, a second rule associated with the plurality of QCL monitoring properties, or a third rule associated with the plurality of QCL monitoring properties. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

According to one wireless communication standard, a UE cannot receive multiple beams (communications having different QCL-TypeD properties) simultaneously in a given serving cell or on multiple serving cells in a same frequency band with CA operation. The wireless communication standard specifies priority rules for PDCCH communications. For example, according to that wireless communication standard, a CORESET is determined based on a priority rule, and PDCCH is monitored only in the CORESET and in any other CORESET that has the same QCL-TypeD properties as the CORESET. The wireless communication standard specifies that priority is determined first according to a priority rule that indicates that a common search space (CSS) has a higher priority than a UE-specific search space (USS), next according to a priority rule that indicates that a component carrier index and/or serving cell index that has a lowest value has a highest priority, and finally according to a priority rule that indicates that a search space (SS) set index that has a lowest value has a highest priority. Other wireless communication standards provide for multi-DCI based multi-TRP communications.

Figure 3:
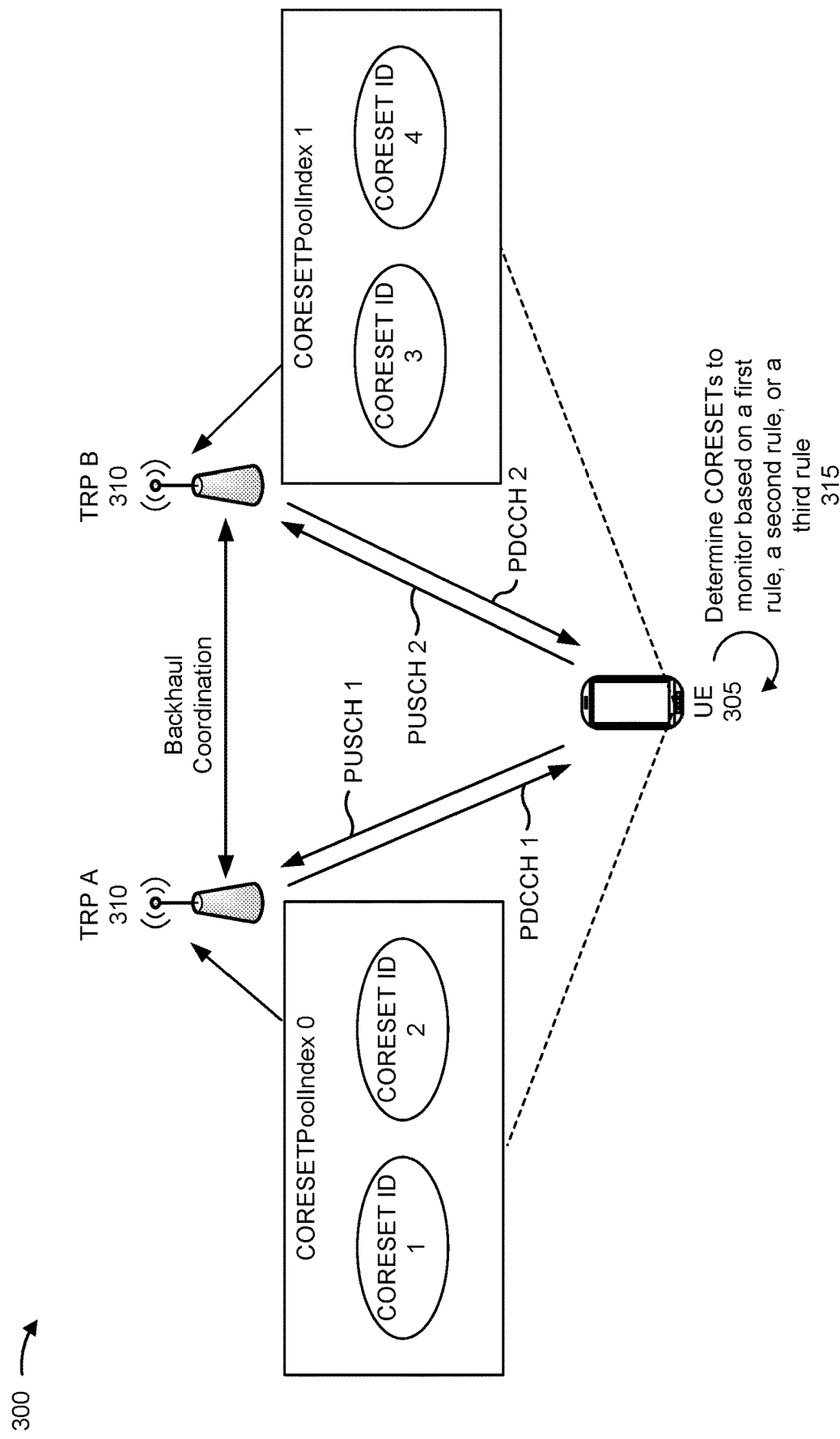
FIG. 3 is a diagram illustrating an example of multiple transmission reception point (multi-TRP) communication (sometimes referred to as multi-panel communication), in accordance with the present disclosure.

FIG. 3 is a diagram illustrating an example 300 of multi-TRP communication (sometimes referred to as multi-panel communication), in accordance with the present disclosure. As shown in FIG. 3, a UE 305 may communicate with multiple TRPs 310. In some aspects, a TRP 310 may be, include, or be included in, a base station 110 described above in connection with FIGS. 1 and 2. For example, different TRPs 310 may be included in different base stations 110. Additionally, or alternatively, multiple TRPs 310 may be included in a single base station 110. In some aspects, a base station 110 may include a control unit (CU) (e.g., of an IAB network) and/or one or more distributed units (DUs) (e.g., one or more TRPs 310). In some cases, a TRP 310 may be referred to as a cell, a panel, an antenna array, or an array. The UE 305 may be, include, or be included in the UE 120 described above in connection with FIGS. 1 and 2.

In some aspects, multiple TRPs 310 may transmit communications (e.g., the same communication or different communications) in the same transmission time interval (TTI) (e.g., a slot, a mini-slot, a subframe, or a symbol) or different TTIs using different QCL relationships (e.g., different spatial parameters, different TCI states, different precoding parameters, and/or different beamforming parameters). In some aspects, a TCI state may be used to indicate one or more QCL relationships. A TRP 310 may be configured to individually (e.g., using dynamic selection) or jointly (e.g., using joint transmission with one or more other TRPs 310) serve traffic to a UE 120.

The multiple TRPs 310 (shown as TRP A and TRP B) may communicate with the same UE 305 in a coordinated manner (e.g., using coordinated multipoint transmissions) to improve reliability and/or increase throughput. The TRPs 310 may coordinate such communications via an interface between the TRPs 310 (e.g., a backhaul interface and/or an access node controller). The interface may have a smaller delay and/or higher capacity when the TRPs 310 are co-located at the same base station 110 (e.g., when the TRPs 310 are different antenna arrays or panels of the same base station 110) and may have a larger delay and/or lower capacity (as compared to co-location) when the TRPs 310 are located at different base stations 110. The different TRPs 310 may communicate with the UE 305 using different QCL relationships (e.g., different TCI states), different DMRS ports, and/or different layers (e.g., of a multi-layer communication).

In a multi-TRP transmission mode, multiple PDCCHs may be used to schedule downlink data communications for multiple corresponding PDSCHs (e.g., one PDCCH for each PDSCH) and/or uplink data communications for multiple corresponding physical uplink shared channels (PUSCHs) (e.g., one PDCCH for each PUSCH). In this case, for example, a first PDCCH may schedule a first codeword to be transmitted by a first TRP 310, and a second PDCCH may schedule a second codeword to be transmitted by a second TRP 310. Furthermore, first DCI (e.g., transmitted by the first TRP 310) may schedule a first PDSCH communication associated with a first set of DMRS ports with a first QCL relationship (e.g., indicated by a first TCI state) for the first TRP 310, and second DCI (e.g., transmitted by the second TRP 310) may schedule a second PDSCH communication associated with a second set of DMRS ports with a second QCL relationship (e.g., indicated by a second TCI state) for the second TRP 310. In this case, DCI (e.g., having DCI format 1_0 or DCI format 1_1) may indicate a corresponding TCI state for a TRP 310 corresponding to the DCI. The TCI field of a DCI indicates the corresponding TCI state (e.g., the TCI field of the first DCI indicates the first TCI state and the TCI field of the second DCI indicates the second TCI state).

As shown in FIG. 3, in some aspects, a first PDCCH (PDCCH 1) transmitted by a first TRP 310 (TRP A) may schedule a first PUSCH (PUSCH 1) for transmitting uplink data to the TRP A 310 and a second TRP 310 (TRP B) may schedule a second PUSCH (PUSCH 2) for transmitting uplink data to the TRP B 310. A CORESET pool index (or CORESETPoolIndex) value may be used by the UE 305 to identify a TRP associated with an uplink grant received on a PDCCH.

"CORESET" may refer to a control region that is structured to support an efficient use of resources, such as by flexible configuration or reconfiguration of resources for one or more PDCCHs associated with a UE. In some aspects, a CORESET may occupy the first symbol of an orthogonal frequency division multiplexing (OFDM) slot, the first two symbols of an OFDM slot, or the first three symbols of an OFDM slot. Thus, a CORESET may include multiple resource blocks (RBs) in the frequency domain, and either one, two, or three symbols in the time domain. In 5G, a quantity of resources included in a CORESET may be flexibly configured, such as by using radio resource control (RRC) signaling to indicate a frequency domain region (for example, a quantity of resource blocks) or a time domain region (for example, a quantity of symbols) for the CORESET.

As illustrated in FIG. 3, a UE 305 may be configured with multiple CORESETs in a given serving cell. Each CORESET configured for the UE 305 may be associated with a CORESET identifier (CORESET ID). For example, a first CORESET configured for the UE 305 may be associated with CORESET ID 1, a second CORESET configured for the UE 305 may be associated with CORESET ID 2, a third CORESET configured for the UE 305 may be associated with CORESET ID 3, and a fourth CORESET configured for the UE 305 may be associated with CORESET ID 4.

As further illustrated in FIG. 3, two or more (for example, up to five) CORESETs may be grouped into a CORESET pool. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 310. As an example, and as illustrated in FIG. 3, the TRP A 310 may be associated with CORESET pool index 0, and the TRP B 310 may be associated with CORESET pool index 1. The UE 305 may be configured by a higher layer parameter, such as PDCCH-Config, with information identifying an association between a TRP and a CORESET pool index value assigned to the TRP. Accordingly, the UE 305 may identify the TRP that transmitted a DCI uplink grant by determining the CORESET ID of the CORESET in which the PDCCH carrying the DCI uplink grant was transmitted, determining the CORESET pool index value associated with the CORESET pool in which the CORESET ID is included, and identifying the TRP 310 associated with the CORESET pool index value. In some cases, PUSCHs can be time division multiplexed (TDMed) in a given CC/serving cell (even across TRPs/CORESET-PoolIndex values), frequency division multiplexed (FDMed), and/or spatial division multiplexed (SDMed).

In some cases, QCL-TypeD prioritization rules can be applied for determining CORESETs to monitor in multi-DCI PDCCH implementations. For example, a first rule (which may be referred to interchangeably herein as the "first rule" or "Rule 1") may state that if the UE 305 can receive two beams (two different QCL-TypeD properties) simultaneously in a given serving cell or in multiple serving cells in a same frequency band with CA operation and, if the UE 305 is configured by a higher layer parameter PDCCH-Config that contains two different values of CORESETPoolIndex in CORESETs for the active bandwidth part (BWP) of a serving cell, the UE 305 monitors PDCCH candidates in overlapping PDCCH monitoring occasions in multiple CORESETs that have the same or different QCL-TypeD properties on active DL BWP(s) of one or more cells. According to the first rule, two CORESETs to be monitored are determined based on the priority rule per CORESET-PoolIndex value, and PDCCH is monitored only in those CORESETs and in any other CORESETs that have the same QCL-TypeD properties as the two determined CORESETs.

In some cases, PDCCH repetition can be implemented, where each repetition is a PDCCH candidate, and where two PDCCH candidates can be linked together for possible repetition of the same DCI. Two PDCCH candidates in different SS sets (associated with corresponding CORESETs) can be linked together for PDCCH repetition (e.g., an SS set with index 2 can be linked with an SS set with index 4). If the two linked SS sets are associated with different CORESETs, and given that TCI state is configured and/or activated per CORESET, different PDCCH repetitions can be transmitted and/or received with different TCI states, thereby enabling beam and/or multi-TRP diversity. Each SS set can have different monitoring occasions (MOs) within a slot and/or across slots. For PDCCH repetition, a MO of a first SS set can be associated and/or linked with a MO of the second SS set. The mechanism for linking MOs of the two SS sets can be rule-based and/or configuration based. Depending on SS set configuration with respect to MOs, PDCCH repetition can be implemented in TDMed and/or FDMed configurations.

For example, a second rule (which may be referred to interchangeably herein as the "second rule" or "Rule 2") may state that for a UE supporting reception with two different beams and configured with PDCCH repetitions, to determine two QCL-TypeD properties for multiple overlapping CORESETs, the UE 305 is to down-select from the following alternative selection rules (labelled "Alt1," "Alt2," and "Alt3"):

Alt1: identify the two QCL-Type D properties based on a legacy (e.g., specified by a prior wireless communication standard) priority order;

Alt2: reuse a legacy priority rule to identify the first QCL-TypeD property and, then, identify the second QCL-TypeD according to one of the SS sets that is linked with an SS set with the first QCL-TypeD (among the multiple overlapping CORESETs), where, in the case of multiple such SS set pairs, the legacy priority order is followed for the second QCL-TypeD determination;

Alt3: assign a same priority for two linked search space sets for PDCCH transmission with overlapping monitoring occasions, where the priority is determined according to one of the two SS sets with a lower SS set ID, and where the priority order is determined by a priority selection rule that indicates that priority is to be determined first according to a rule associated with the SS type (e.g., USS vs. CSS), next according to a rule associated with a linkage of SS sets, then according to a rule associated with cell index values and, finally, according to a rule associated with SS set ID. In Alt3, a linked SS set has a higher priority than an individual SS set.

A CORESET that has two active TCI states can be configured and/or activated with single-frequency network (SFN) transmission, in which case, the PDCCH DMRS (which can occupy one port) is associated with the two active TCI states. The UE 305 can determine the QCL of the CORESET based on a composite QCL derived from the two RSs (which may include, for example, an SSB, a CSI-RS, and/or a tracking reference signal (TRS)) associated with the two TCI states. The PDCCH (e.g., the DMRS port and control resource elements (REs)) can be received based on the composite QCL.

A third rule (which may be referred to interchangeably herein as the "third rule" or "Rule 3") may state that, if the UE 305 can receive two beams (e.g., two different QCL-TypeD properties) simultaneously in a given serving cell or on multiple serving cells in same frequency band with CA operation, and if the UE 305 is configured with SFNed CORESETs for the active BWP of a serving cell, the UE 305 monitors PDCCH candidates in overlapping PDCCH monitoring occasions in multiple CORESETs that have the same or different QCL-TypeD properties on active DL BWP(s) of one or more cells. The third rule may further state that, if there is at least one CORESET with two QCL-TypeD properties among the multiple CORESETs, the UE 305 is to exclude all CORESETs with one QCL-TypeD property, then determine a monitoring CORESET based on the legacy priority rule described above.

In the case of a UE configured for multi-DCI and PDCCH repetition, where at least one CORESETPoolIndex has CORESETs associated with linked SS sets that have different TCI states (different QCL-type D properties), none of the three rules discussed above is specified for QCL-Type D prioritization, as none of the rules contemplate two linked PDCCH candidates that are associated with different CORESETPoolIndex values. Additionally, in the case of PDCCH repetition with SFNed CORESETs (e.g., where two SS sets are linked to each other for repetition and are associated with different CORESETs, and at least one of the two CORESETs is activated with two TCI states), none of the three rules is specified for determining CORESETs to be monitored. Thus, in these two situations, a UE may not determine CORESETs to monitor and, as a result, may miss communications. Missed communications can lead to inefficiencies and other negative impacts to network performance.

Some aspects of the techniques and apparatuses described herein may provide mechanisms for selecting one or more rules of the three rules discussed above to be used to determine CORESETs to be monitored. For example, as shown by reference number 315, the UE 305 may determine CORESETs to monitor based at least in part on a first rule associated with a plurality of QCL monitoring properties, a second rule associated with the plurality of QCL monitoring properties, or a third rule associated with the plurality of QCL monitoring properties. In this way, some aspects of the techniques described herein may facilitate determining CORESETs to monitor in the situations described above, thereby improving efficiencies and, in this way, positively impacting network performance.

Figure 4:
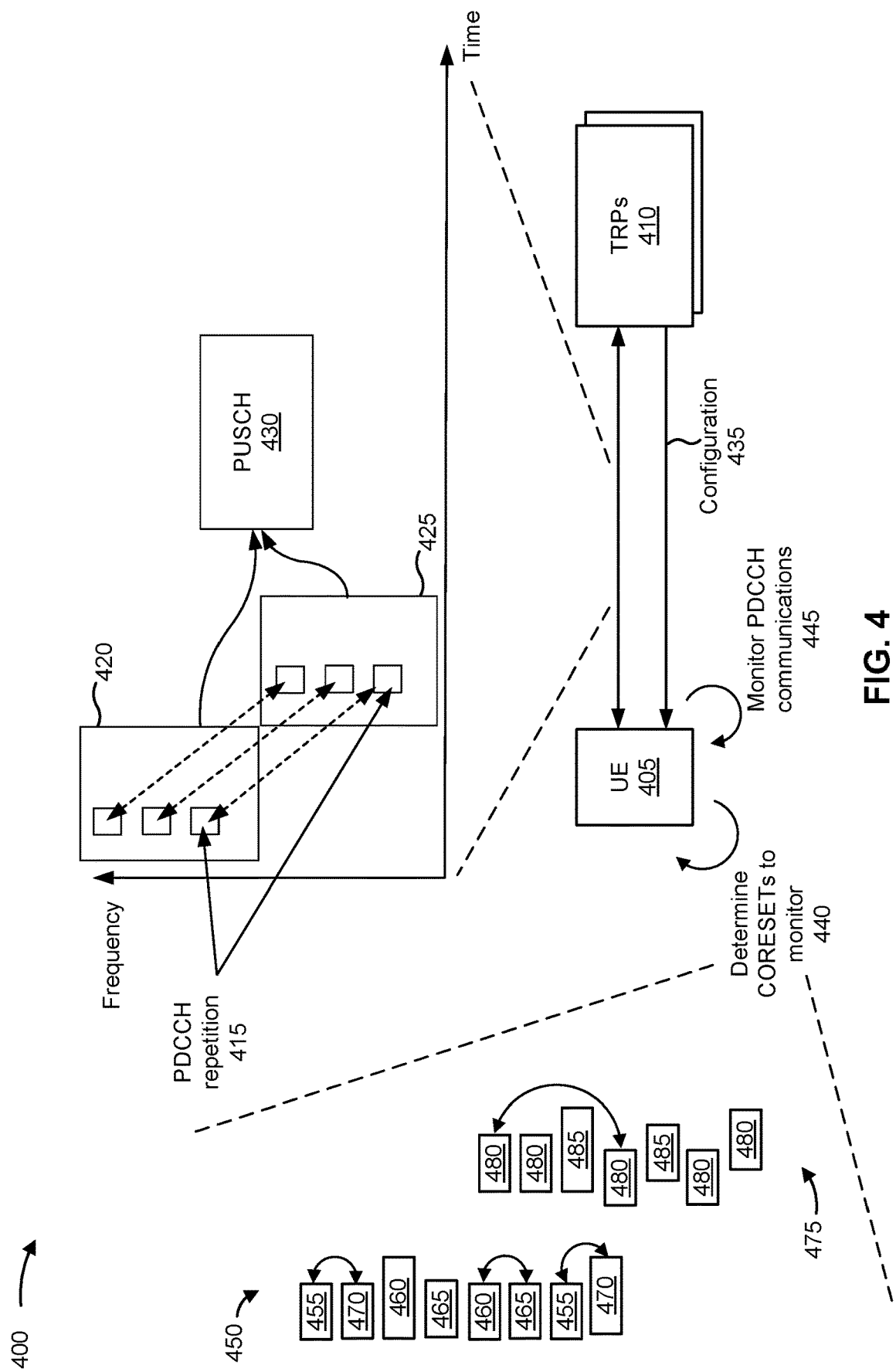
FIGS. 4 and 5 are diagrams illustrating examples associated with quasi co-location (QCL) prioritization rules for multiple downlink control information (multi-DCI) reception and physical downlink control channel (PDCCH) repetition, in accordance with the present disclosure.

FIG. 4 is a diagram illustrating an example 400 associated with QCL prioritization rules for multi-DCI reception and PDCCH repetition, in accordance with the present disclosure. As shown in FIG. 4, a UE 405 and TRPs 410 may communicate with one another. For example, the UE 405 may be, be similar to, include, or be included in the UE 305 shown in FIG. 3. The TRPs 410 may be, be similar to, include, or be included in, the TRPs 310 shown in FIG. 3.

As shown, the TRPs 410 may repeat a transmission of a PDCCH communication, which may be referred to as a PDCCH repetition 415. As used herein, the term "repetition" is used to refer to an initial communication and is also used to refer to a repeated transmission of the initial communication. For example, if the TRPs 410 are configured to transmit four repetitions, then the TRPs 410 may transmit an initial transmission and may transmit three repeated transmissions of that initial transmission. Thus, each transmission (regardless of whether the transmission is an initial transmission or a retransmission) is considered a repetition. A repetition may be transmitted in a transmission occasion, which is sometimes referred to as a transmission instance. The PDCCH repetition 415 may include, for example, a DCI repetition.

The PDCCH repetition 415 may be repeated within a number of monitoring occasions 420 and 425, each of which may be associated with a corresponding SS set, and each SS set may be associated with a corresponding CORESET. Each PDCCH repetition 415 may be associated with a PUSCH communication 430. For example, the PDCCH repetitions 415 may include DCI that schedules and/or triggers the PUSCH communication 430. In some aspects, the PUSCH communication 430 may be a PUSCH repetition of a number of PUSCH repetitions. In some aspects, the first monitoring occasion may be associated with a first component carrier, and the second monitoring occasion may be associated with a second component carrier. In some aspects, the second component carrier may be the first component carrier.

In some cases, where PDCCH repetition is used, each repetition may be a PDCCH candidate, and two PDCCH candidates (e.g., repetitions 415) can be linked together for possible repetition of the same DCI (as shown by the dashed arrows in FIG. 4). As shown in FIG. 4, two PDCCH candidates in different monitoring occasions 420 and 425 of different corresponding search space sets (associated with corresponding CORESETs) may be linked together for PDCCH repetition. If the two linked search space sets are associated with different CORESETs, and the TCI state is configured and/or activated per CORESET, different PDCCH repetitions may be transmitted and/or received with different TCI states, thereby enabling beam and/or multi-TRP diversity.

Figure 7:
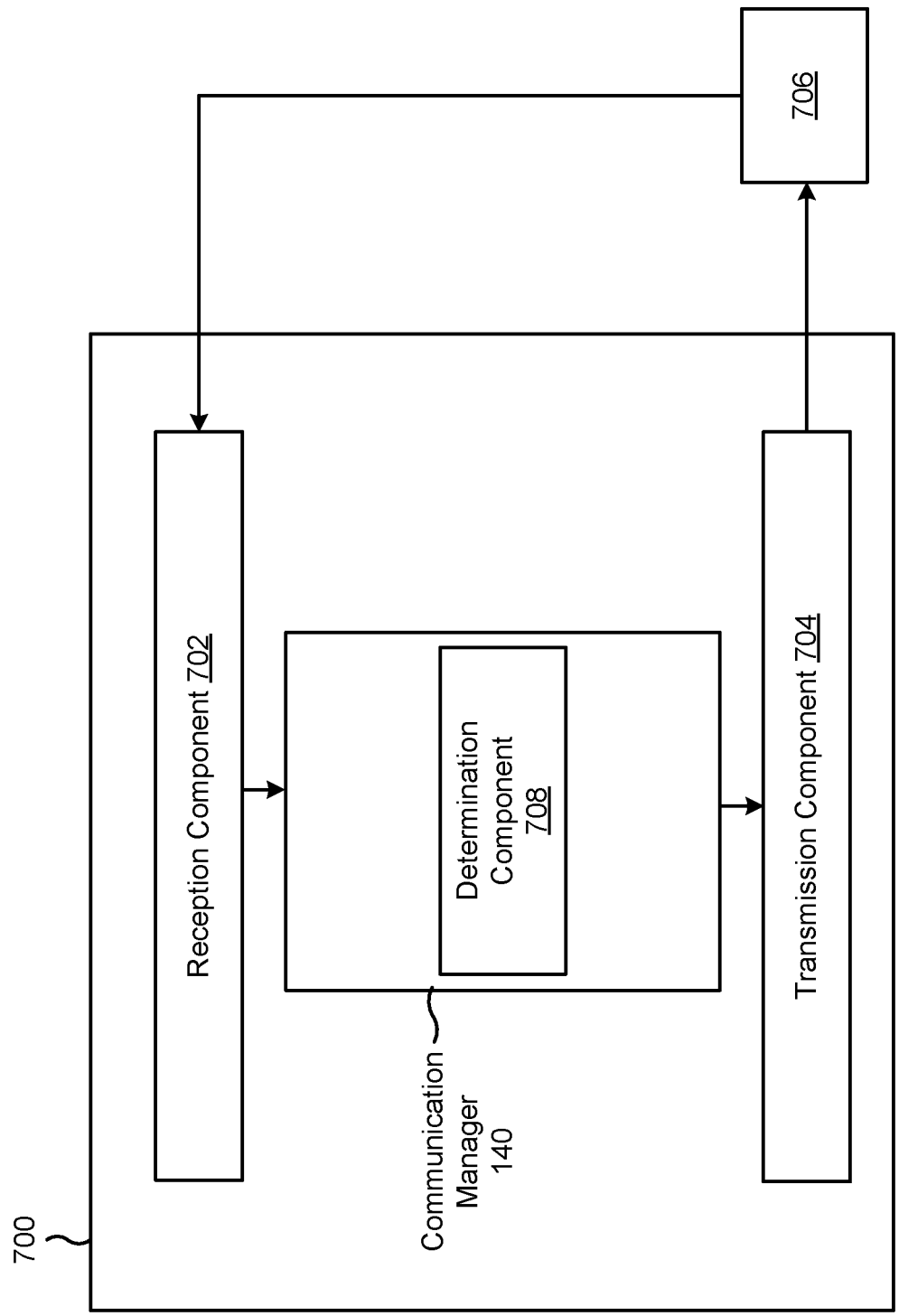
FIGS. 7 and 8 are diagrams of example apparatuses for wireless communication, in accordance with the present disclosure.
Figure 8:
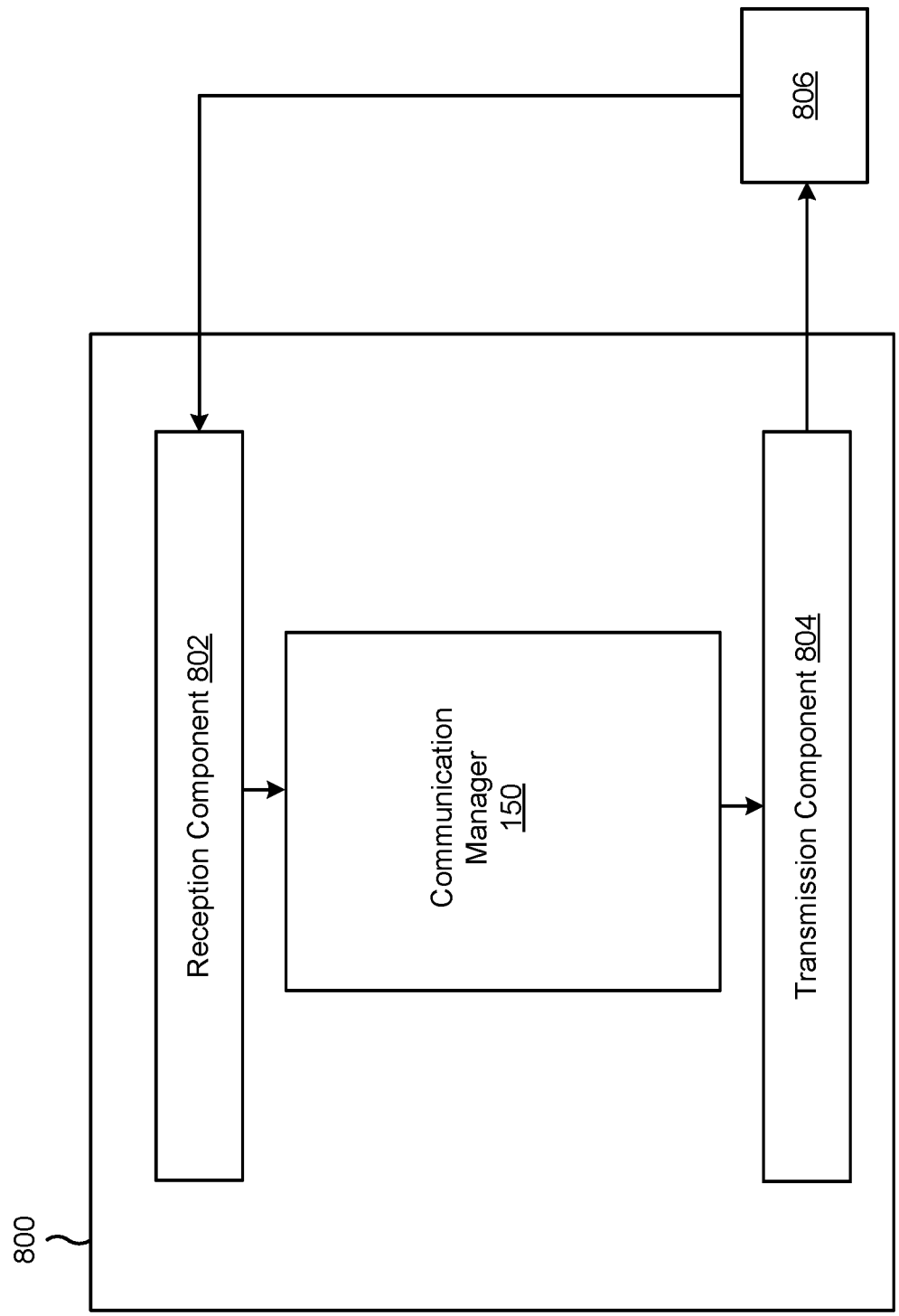

As shown by reference number 435, one or more of the TRPs 410 may transmit (e.g., using communication manager 150 and/or transmission component 804, depicted in FIG. 8), and the UE 405 may receive (e.g., using communication manager 140 and/or reception component 702, depicted in FIG. 7), a configuration. The configuration may configure PDCCH repetition and multi-DCI reception where, for at least one CORESET pool index, a first monitoring occasion 420 of a first linked search space set, associated with a first CORESET and having a first TCI state, overlaps with a second monitoring occasion 425 of a second linked search space set associated with a second CORESET having a second TCI state, wherein the at least one CORESET pool index comprises at least one of a first CORESET pool index or a second CORESET pool index.

As shown by reference number 440, the UE 405 may determine a plurality of monitored CORESETs of a set of overlapping CORESETs (e.g., using determination component 708, depicted in FIG. 7). The UE 405 may determine the monitored CORESETs based at least in part on a first rule associated with a plurality of QCL monitoring properties, a second rule associated with the plurality of QCL monitoring properties, or a third rule associated with the plurality of QCL monitoring properties. In some aspects, the UE 405 may determine the plurality of QCL monitoring properties.

In some aspects, the first rule may be associated with determination of only one respective QCL monitoring property, of the plurality of QCL monitoring properties, corresponding to each of a first CORESET pool index and a second CORESET pool index. The second rule may be associated with identification of a first QCL monitoring property and a second QCL monitoring property based at least in part on a down-selection from a set of selection rules. For example, the set of selection rules may include a first selection rule associated with a specified priority order, a second selection rule associated with identification of the first QCL monitoring property based at least in part on the specified priority order and identification of the second QCL monitoring property based at least in part on identification of the first linked search space set and the second linked search space set, where one of the first linked search space set and the second linked search space set is associated with the first QCL monitoring property, and a third selection rule associated with a search space set priority rule corresponding to a linkage of at least the first linked search space set and the second linked search space set. In some aspects, the third rule may be associated with an identification of a CORESET of the plurality of overlapping CORESETs based at least in part on exclusion of one or more CORESETs of the plurality of overlapping CORESETs having only one associated QCL monitoring property and application of a PDCCH priority rule to a set of remaining CORESETs.

In some aspects, a determination of which rule to apply may depend on whether the multiple overlapping CORESETs belong to one CORESETPoolIndex or both CORESETPoolIndexs, if the multiple overlapping CORESETs belong to both CORESETPoolIndexs, the first rule may be applied to determine the monitored CORESETs per CORESETPoolIndex. Otherwise, the second rule may be applied to determine the monitored CORESETs. In some aspects, only one QCL-Type D property may be determined per CORESETPoolIndex.

For example, in some aspects, the UE 405 may determine (e.g., using determination component 708, depicted in FIG. 7) whether to apply the first rule or the second rule based at least in part on whether the set of overlapping CORESETs belong to one CORESET pool index, of the first CORESET pool index and the second CORESET pool index, or to both CORESET pool indexes. If the set of overlapping CORESETs belong to the first CORESET pool index and the second CORESET pool index, the UE 405 may the plurality of monitored CORESETs may be based at least in part on an application of the first rule. If the set of overlapping CORESETs belong to only one of the first CORESET pool index or the second CORESET pool index, the UE 405 may determine the plurality of monitored CORESETs may be based at least in part on an application of the second rule.

In some aspects, according to another determination option, the UE 405 may determine (e.g., using determination component 708, depicted in FIG. 7) which rule to apply depending on whether there is at least a monitoring occasion of a first linked SS set associated with a first CORESET with a first TCI state that overlaps with a monitoring occasion of a second linked SS set associated with a second CORESET with a second TCI state. If so, the second rule may be applied to determine the monitoring CORESETs and, otherwise, the first rule may be applied.

For example, in some aspects, the UE 405 may determine whether to apply the first rule or the second rule based at least in part on whether at least one monitoring occasion of the first linked search space set associated with a first CORESET having the first TCI state overlaps with a monitoring occasion of the second linked search space set associated with a second CORESET having the second TCI state. If at least one monitoring occasion of the first linked search space set associated with a first CORESET having the first TCI state overlaps with a monitoring occasion of the second linked search space set associated with a second CORESET having the second TCI state, the UE 405 may determine the plurality of monitored CORESETs based at least in part on an application of the second rule. If no monitoring occasion of the first linked search space set associated with a first CORESET having the first TCI state overlaps with a monitoring occasion of the second linked search space set associated with a second CORESET having the second TCI state, the UE 405 may determine the plurality of monitored CORESETs based at least in part on an application of the first rule.

In some aspects, according to another determination option, the UE 405 may determine two CORESETs (two QCL-TypeD properties) from the CORESETs from one CORESETPoolIndex value (e.g., CORESETPoolIndex=0), and may monitor PDCCH in the first and second determined CORESETs and in any other CORESETs having the same QCL-TypeD properties of the first and second determined CORESETs. The second rule may be applied to determine the two CORESETs (two QCL-TypeD properties) from the CORESETs from one CORESETPoolIndex value.

In some aspects, for example, the UE 405 may determine the monitoring CORESETs based at least in part on the second rule. The UE 405 may further determine a first CORESET, of the set of overlapping CORESETs, that is associated with the first CORESET pool index and may determine a second CORESET, of the plurality of overlapping CORESETs, that is associated with the first CORESET pool index.

As shown by reference number 445, the UE 405 may monitor (e.g., using the communication manager 140 and/or the reception component 702, depicted in FIG. 7) the PDCCH communications in at least one of the first CORESET, the second CORESET, or any other CORESET having at least one QCL monitoring property in common with the first CORESET and the second CORESET. The UE 405 may determine the first CORESET by applying the second rule, and the UE 405 may determine the second CORESET by applying the second rule. In some aspects, the UE 405 may determine the first and second CORESETs by applying the first rule.

In some aspects, according to another determination option, the UE 405 may determine one QCL-TypeD property for monitoring CORESETs per CORESETPoolIndex value. The UE 405 may monitor PDCCH in the first and second determined CORESETs and in any other CORESETs having the same QCL-TypeD properties of the first and second determined CORESETs. For each CORESETPoolIndex value, the one QCL-TypeD property may be determined based on a new priority rule taking the linkage of two SS Sets into consideration. A selection rule may be used to select the priority rule from among the following alternatives that indicate the order of priority for the respective priority rules:

Alt 1: Linkage of SS sets→CSS over USS→Lowest CC index→Lowest SS Set index;
Alt 2: CSS over USS→Linkage of SS sets→Lowest CC index→Lowest SS Set index;
Alt 3: CSS over USS→Lowest CC index→Linkage of SS sets→Lowest SS Set index; and
Alt 4: CSS over USS→Lowest CC index→Lowest SS Set index→Linkage of SS sets.

For example, in some aspects, the first rule may be associated with determination of only one respective QCL monitoring property, of the plurality of QCL monitoring properties, corresponding to each of the first CORESET pool index and the second CORESET pool index of the at least one CORESET pool index. The UE 405 may determine the only one respective QCL monitoring property based at least in part on at least one decision factor of a plurality of decision factors. The at least one decision factor may be based at least in part on a priority rule. The plurality of decision factors may include a first decision factor that indicates selection of the one respective QCL monitoring property based at least in part on a linkage between the first linked search space set and the second linked search space set, a second decision factor that indicates selection of the one respective QCL monitoring property based at least in part on an association with at least one of a common search space or a UE-specific search space, a third decision factor that indicates selection of the one respective QCL monitoring property based at least in part on a lowest component carrier index of a plurality of component carrier indexes, and a fourth decision factor that indicates selection of the one respective QCL monitoring property based at least in part on a lowest search space set index of a plurality of search space set indexes.

The priority rule may indicate that the first decision factor has a higher priority than the second decision factor, the second decision factor has a higher priority than the third decision factor, and the third decision factor has a higher priority than the fourth decision factor. The priority rule may indicate that the second decision factor has a higher priority than the first decision factor, the first decision factor has a higher priority than the third decision factor, and the third decision factor has a higher priority than the fourth decision factor. The priority rule may indicate that the second decision factor has a higher priority than the third decision factor, the third decision factor has a higher priority than the first decision factor, and the first decision factor has a higher priority than the fourth decision factor. The priority rule may indicate that the second decision factor has a higher priority than the third decision factor, the third decision factor has a higher priority than the fourth decision factor, and the fourth decision factor has a higher priority than the first decision factor.

For example, as shown by reference number 450, a number of PDCCH candidates may be configured in overlapping PDCCH monitoring occasions in two cells (CC0 and CC1 in the same band). PDCCH candidates 455 may have a first QCL-TypeD property x, PDCCH candidates 460 may have a second QCL-TypeD property y, PDCCH candidates 465 may have a third QCL-TypeD property z, and PDCCH candidates 470 may have a fourth QCL-TypeD property t. PDCCH candidates connected by arrows may be linked for PDCCH repetition. The PDCCH candidates may be associated with the following CORESETS and properties, respectively, starting from the uppermost PDCCH candidate and moving downward:

CORESET1: DCI in CSS set with index=1 in CC 0 with CORESETPoolIndex=0;
CORESET1: DCI in CSS set with index=2 in CC 0 with CORESETPoolIndex=0;
CORESET3: DCI in CSS set with index=2 in CC 1 with CORESETPoolIndex=0;
CORESET4: DCI in CSS set with index=3 in CC 1 with CORESETPoolIndex=1;
CORESET5: DCI in USS set with index=1 in CC 0 with CORESETPoolIndex=1;
CORESET6: DCI in USS set with index=3 in CC 0 with CORESETPoolIndex=1;
CORESET7: DCI in USS set with index=2 in CC 1 with CORESETPoolIndex=0; and CORESET8: DCI in USS set with index=3 in CC 1 with CORESETPoolIndex=0.

In some aspects, the UE 405 may determine the monitored CORESETS in accordance with Table 1, below, that illustrates results of the example selected options in the left column.

TABLE 1

| | Determined CORESETs | Determined QCL-TypeD properties | Monitored CORESETs |
|---|---|---|---|
| Option 1 (Rule 1) | 1 and 4 | x and z | 1, 4, 6, 7 |
| Option 3 (Rule 2, Alt 3) | 1 and 2 | x and t | 1, 2, 7, 8 |
| Option 4, Alt 1 | 1 and 5 | x and y | 1, 3, 5, 7 |

In some aspects, if the UE 405 is configured with PDCCH repetition and SFNed CORESETs, the UE 405 may determine two QCL-TypeD properties for PDCCH monitoring in overlapping PDCCH monitoring occasions across multiple CORESETs (e.g., in the same CC or in different CCs for intra-band CA). The UE 405 may monitor PDCCH in the determined CORESET(s) and in any other CORESETs having the same QCL-TypeD properties of the first and second determined CORESETs.

According to a first determination option, the UE 405 may apply the second rule or the third rule depending on whether there is at least one CORESET among the multiple overlapping CORESETs having two associated QCL-TypeD properties (SFNed CORESET). If there is at least one SFNed CORESET, the UE 405 may apply the third rule to determine the monitored CORESETs. Otherwise, the UE 405 may apply the second rule to determine the monitored CORESETs.

For example, in some aspects, the configuration may include an SFN CORESET configuration, and the UE 405 may monitor the PDCCH communications in the plurality of the monitored CORESETs. In some aspects, the UE 405 may determine whether to apply the third rule or the second rule based at least in part on whether at least one CORESET of the plurality of overlapping CORESETs includes two associated QCL monitoring properties. In some aspects, if at least one CORESET of the plurality of overlapping CORESETs includes two associated QCL monitoring properties, the UE 405 may determine the plurality of monitored CORESETS based at least in part on an application of the third rule. If no CORESET of the plurality of overlapping CORESETs includes two associated QCL monitoring properties, the UE 405 may determine the plurality of monitored CORESETs based at least in part on an application of the second rule. In some aspects, the UE 405 may monitor the PDCCH communications by monitoring in at least one additional CORESET having an associated QCL monitoring property that is also associated with the plurality of the monitored CORESETs.

According to a second determination option, the UE 405 may apply the second rule or the third rule depending on whether there is at least a monitoring occasion of a first linked SS set associated with a first CORESET with a first TCI states that overlaps with a monitoring occasion of a second linked SS set associated with a second CORESET with a second TCI states. If so, the UE 405 may apply the second rule and, if not, the UE 405 may apply the third rule.

For example, in some aspects, the UE 405 may determine whether to apply the first rule or the second rule based at least in part on whether at least one monitoring occasion of the first linked search space set associated with a first CORESET having the first TCI state overlaps with a monitoring occasion of the second linked search space set associated with a second CORESET having the second TCI state. If at least one monitoring occasion of the first linked search space set associated with a first CORESET having the first TCI state overlaps with a monitoring occasion of the second linked search space set associated with a second CORESET having the second TCI state, the UE 405 may apply the second rule. If no monitoring occasion of the first linked search space set associated with a first CORESET having the first TCI state overlaps with a monitoring occasion of the second linked search space set associated with a second CORESET having the second TCI state, the UE 405 may apply the third rule.

For example, as shown by reference number 475, a number of PDCCH candidates may be configured in overlapping PDCCH monitoring occasions in two cells (CC0 and CC1 in the same band) and the CORESETs may be SFNed such that some PDCCH candidates may include more than one QCL Type-D property. PDCCH candidates 480 may have one QCL-TypeD property, whereas PDCCH candidates 485 may have two QCL-TypeD properties. PDCCH candidates connected by arrows may be linked for PDCCH repetition. The PDCCH candidates may be associated with the following CORESETS and properties, respectively, starting from the uppermost PDCCH candidate and moving downward: CORESET1: DCI in CSS set with index=2 in CC 0 with QCL-TypeD property x; CORESET2: DCI in CSS set with index=1 in CC 1 with QCL-TypeD properties t; CORESET3: DCI in CSS set with index=2 in CC 1 with QCL-TypeD properties x, y; CORESET4: DCI in CSS set with index=3 in CC 1 with QCL-TypeD properties z; CORESET5: DCI in USS set with index=3 in CC 0 with QCL-TypeD properties x, z; CORESET6: DCI in USS set with index=2 in CC 1 with QCL-TypeD properties y; and CORESET7: DCI in USS set with index=3 in CC 1 with QCL-TypeD properties z.

In some aspects, the UE 405 may determine the monitored CORESETS in accordance with Table 2, below, that illustrates results of the example selected options in the left column.

TABLE 2

| | Determined CORESETs | QCL-TypeD properties | Monitored CORESETs |
|---|---|---|---|
| Option 1 (Rule 1) | 3 | x and y | 1, 3, 5 |
| Option 2 (Rule 2) | 1 and 4 | x and z | 1, 4, 5, 7 |

As indicated above, FIG. 4 is provided as an example. Other examples may differ from what is described with regard to FIG. 4.

Figure 5:
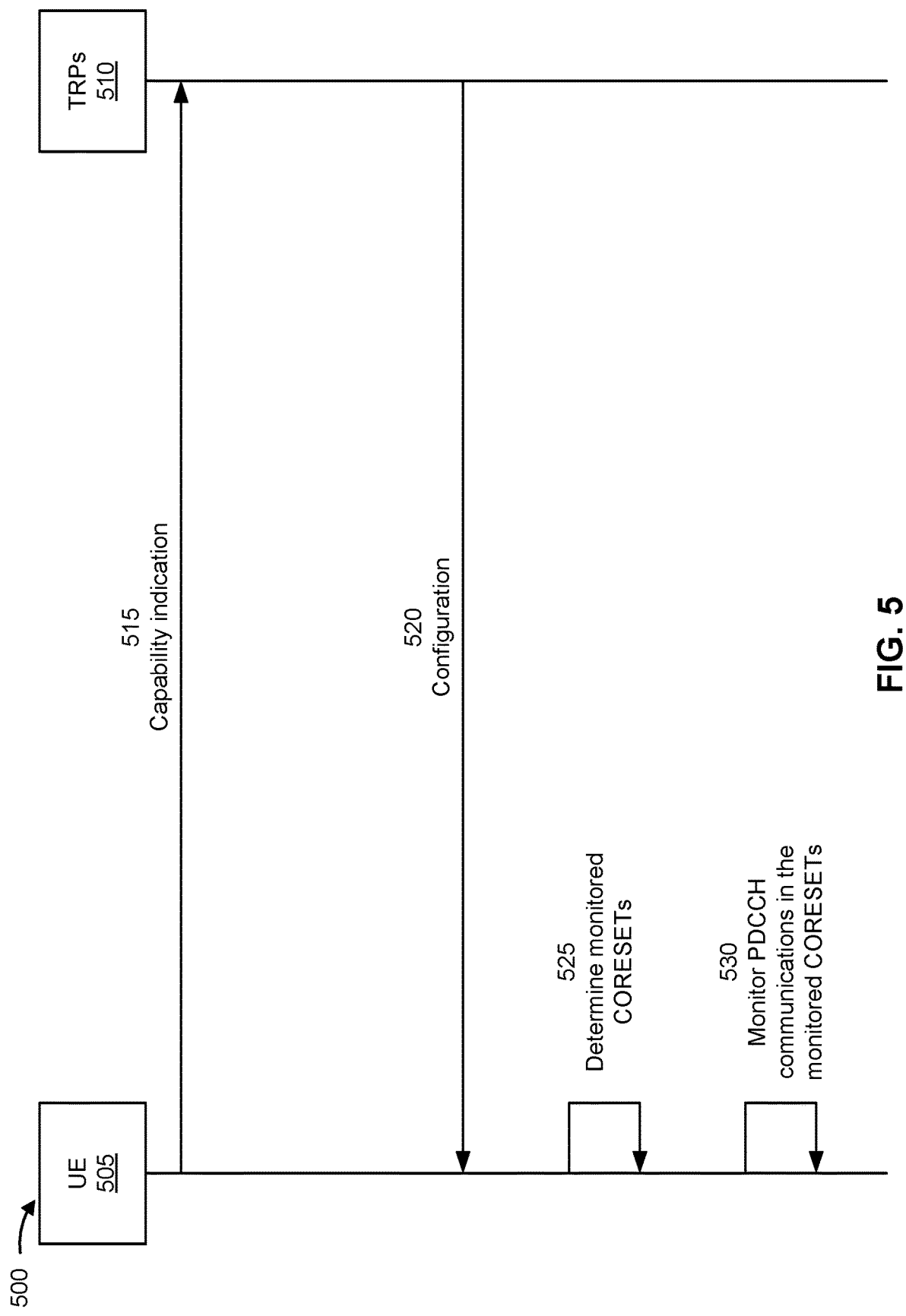

FIG. 5 is a diagram illustrating an example 500 associated with associated with QCL prioritization rules for multi-DCI reception and PDCCH repetition, in accordance with the present disclosure. As shown in FIG. 5, a UE 505 and TRPs 510 may communicate with one another. For example, the UE 505 may be, be similar to, include, or be included in the UE 405 shown in FIG. 4 and/or UE 305 shown in FIG. 3. The TRPs 510 may be, be similar to, include, or be included in, the TRPs 410 shown in FIG. 4 and/or the TRPs 310 shown in FIG. 3.

As shown by reference number 515, the UE 505 may transmit, and the TRPs 510 may receive, a capability indication. The capability indication may indicate a capability for receiving two QCL properties simultaneously. As shown by reference number 520, one or more of the TRPs 510 may transmit, and the UE 505 may receive, a configuration. The configuration may configure PDCCH repetition and multi-DCI reception where, for at least one CORESET pool index, a first monitoring occasion of a first linked search space set, associated with a first CORESET and having a first TCI state, overlaps with a second monitoring occasion of a second linked search space set associated with a second CORESET having a second TCI state, where the at least one CORESET pool index comprises at least one of a first CORESET pool index or a second CORESET pool index.

As shown by reference number 525, the UE 405 may determine monitored CORESETs in accordance with one or more of the techniques described above in connection with FIG. 4. As shown by reference number 530, the UE 405 may monitor PDCCH communications in a set of overlapping monitoring occasions, that includes the first monitoring occasion and the second monitoring occasion, based at least in part on a determination of a plurality of monitored CORESETs of a set of overlapping CORESETs.

As indicated above, FIG. 5 is provided as an example. Other examples may differ from what is described with respect to FIG. 5.

Figure 6:
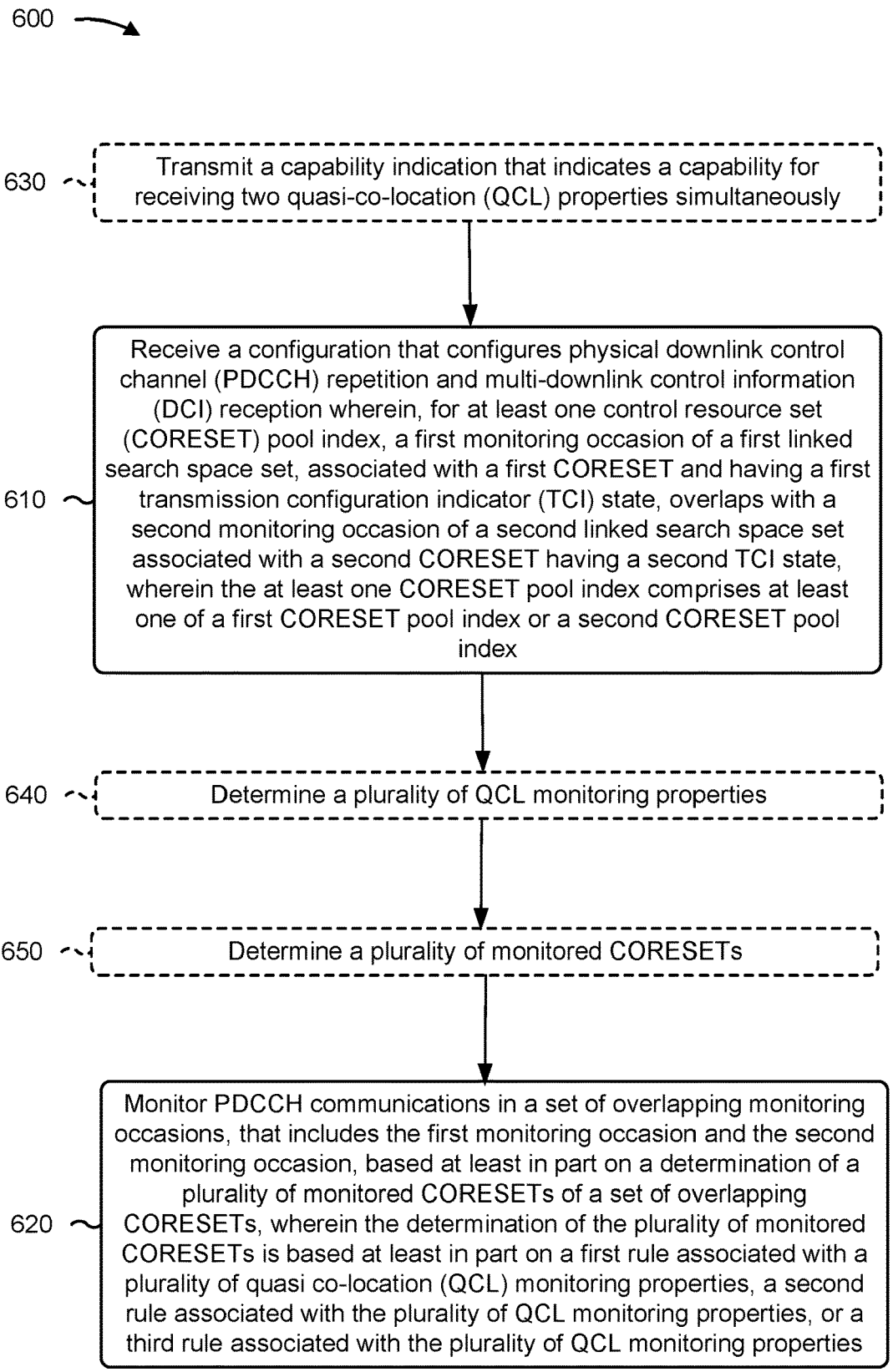
FIG. 6 is a diagram illustrating an example process associated with QCL prioritization rules for multi-DCI reception and PDCCH repetition, in accordance with the present disclosure.

FIG. 6 is a diagram illustrating an example process 600 performed, for example, by a UE, in accordance with the present disclosure. Example process 600 is an example where the UE (e.g., UE 505) performs operations associated with quasi co-location prioritization rules for multi-downlink control information reception and physical downlink control channel repetition.

As shown in FIG. 6, in some aspects, process 600 may include receiving a configuration that configures PDCCH repetition and multi-DCI reception wherein, for at least one CORESET pool index, a first monitoring occasion of a first linked search space set, associated with a first CORESET and having a first TCI state, overlaps with a second monitoring occasion of a second linked search space set associated with a second CORESET having a second TCI state, wherein the at least one CORESET pool index comprises at least one of a first CORESET pool index or a second CORESET pool index (block 610). For example, the UE (e.g., using communication manager 140 and/or reception component 702, depicted in FIG. 7) may receive a configuration that configures PDCCH repetition and multi-DCI reception wherein, for at least one CORESET pool index, a first monitoring occasion of a first linked search space set, associated with a first CORESET and having a first TCI state, overlaps with a second monitoring occasion of a second linked search space set associated with a second CORESET having a second TCI state, wherein the at least one CORESET pool index comprises at least one of a first CORESET pool index or a second CORESET pool index, as described above.

As further shown in FIG. 6, in some aspects, process 600 may include monitoring PDCCH communications in a set of overlapping monitoring occasions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of QCL monitoring properties, a second rule associated with the plurality of QCL monitoring properties, or a third rule associated with the plurality of QCL monitoring properties (block 620). For example, the UE (e.g., using communication manager 140 and/or reception component 702, depicted in FIG. 7) may monitor PDCCH communications in a set of overlapping monitoring occa-sions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of QCL monitoring properties, a second rule associated with the plurality of QCL monitoring properties, or a third rule associated with the plurality of QCL monitoring properties, as described above.

Process 600 may include additional aspects, such as any single aspect or any combination of aspects described below and/or in connection with one or more other processes described elsewhere herein.

In a first aspect, process 600 includes transmitting a capability indication that indicates a capability for receiving two QCL properties simultaneously, wherein receiving the configuration comprises receiving the configuration based at least in part on transmitting the capability indication (block 630). For example, the UE (e.g., using communication manager 140 and/or transmission component 704, depicted in FIG. 7) may transmit a capability indication that indicates a capability for receiving two QCL properties simultaneously, wherein receiving the configuration comprises receiving the configuration based at least in part on transmitting the capability indication. In a second aspect, alone or in combination with the first aspect, process 600 includes determining the plurality of QCL monitoring properties (block 640) and determining the plurality of monitored CORESETs (block 650). For example, the UE (e.g., using communication manager 140 and/or determination component 708, depicted in FIG. 7) may determine the plurality of QCL monitoring properties and the plurality of monitored CORESETs.

In a third aspect, alone or in combination with one or more of the first through second aspects, the first monitoring occasion is associated with a first component carrier and the second monitoring occasion is associated with a second component carrier. In a fourth aspect, alone or in combination with the third aspect, the second component carrier is the first component carrier.

In a fifth aspect, alone or in combination with one or more of the first through fourth aspects, application of the first rule or the second rule is based at least in part on whether the set of overlapping CORESETs belong to one CORESET pool index, of the first CORESET pool index and the second CORESET pool index, or to both CORESET pool indexes. In a sixth aspect, alone or in combination with one or more of the first through fifth aspects, the set of overlapping CORESETs belong to the first CORESET pool index and the second CORESET pool index, and the determination of the plurality of monitored CORESETs is based at least in part on an application of the first rule. In a seventh aspect, alone or in combination with one or more of the first through fifth aspects, the set of overlapping CORESETs belong to only one of the first CORESET pool index or the second CORESET pool index, and the determination of the plurality of monitored CORESETs is based at least in part on an application of the second rule.

In an eighth aspect, alone or in combination with one or more of the first through seventh aspects, application of the first rule or the second rule is based at least in part on whether at least one monitoring occasion of the first linked search space set associated with a first CORESET having the first TCI state overlaps with a monitoring occasion of the second linked search space set associated with a second CORESET having the second TCI state.

In a ninth aspect, alone or in combination with one or more of the first through eighth aspects, at least one monitoring occasion of the first linked search space set associated with a first CORESET having the first TCI state overlaps with a monitoring occasion of the second linked search space set associated with a second CORESET having the second TCI state, and the determination of the plurality of monitored CORESETs is based at least in part on an application of the second rule. In a tenth aspect, alone or in combination with one or more of the first through eighth aspects, no monitoring occasion of the first linked search space set associated with a first CORESET having the first TCI state overlaps with a monitoring occasion of the second linked search space set associated with a second CORESET having the second TCI state, and the determination of the plurality of monitored CORESETs is based at least in part on an application of the first rule.

In an eleventh aspect, alone or in combination with one or more of the first through tenth aspects, the determination is based at least in part on the second rule, and process 600 further includes determining a first CORESET, of the set of overlapping CORESETs, that is associated with the first CORESET pool index, and determining a second CORESET, of the plurality of overlapping CORESETs, that is associated with the first CORESET pool index, wherein monitoring the PDCCH communications comprises monitoring in at least one of the first CORESET, the second CORESET, or an additional CORESET having at least one QCL monitoring property in common with the first CORESET and the second CORESET. In a twelfth aspect, alone or in combination with the eleventh aspect, determining the first CORESET comprises applying the second rule and determining the second CORESET comprises applying the second rule. In a thirteenth aspect, alone or in combination with the eleventh aspect, determining the first CORESET comprises applying the first rule, and determining the second CORESET comprises applying the first rule.

In a fourteenth aspect, alone or in combination with one or more of the first through thirteenth aspects, the first rule is associated with determination of only one respective QCL monitoring property, of the plurality of QCL monitoring properties, corresponding to each of the first CORESET pool index and the second CORESET pool index of the at least one CORESET pool index, the determination of the only one respective QCL monitoring property is based at least in part on at least one decision factor of a plurality of decision factors, and the at least one decision factor is based at least in part on a priority rule. In a fifteenth aspect, alone or in combination with the fourteenth aspect, the plurality of decision factors comprises a first decision factor that indicates selection of the one respective QCL monitoring property based at least in part on a linkage between the first linked search space set and the second linked search space set, a second decision factor that indicates selection of the one respective QCL monitoring property based at least in part on an association with at least one of a common search space or a UE-specific search space, a third decision factor that indicates selection of the one respective QCL monitoring property based at least in part on a lowest component carrier index of a plurality of component carrier indexes, and a fourth decision factor that indicates selection of the one respective QCL monitoring property based at least in part on a lowest search space set index of a plurality of search space set indexes.

In a sixteenth aspect, alone or in combination with the fifteenth aspect, the priority rule indicates that the first decision factor has a higher priority than the second decision factor, the second decision factor has a higher priority than the third decision factor, and the third decision factor has a higher priority than the fourth decision factor. In a seventeenth aspect, alone or in combination with the fifteenth aspect, the priority rule indicates that the second decision factor has a higher priority than the first decision factor, the first decision factor has a higher priority than the third decision factor, and the third decision factor has a higher priority than the fourth decision factor. In an eighteenth aspect, alone or in combination with the fifteenth aspect, the priority rule indicates that the second decision factor has a higher priority than the third decision factor, the third decision factor has a higher priority than the first decision factor, and the first decision factor has a higher priority than the fourth decision factor. In a nineteenth aspect, alone or in combination with the fifteenth aspect, the priority rule indicates that the second decision factor has a higher priority than the third decision factor, the third decision factor has a higher priority than the fourth decision factor, and the fourth decision factor has a higher priority than the first decision factor.

In a twentieth aspect, alone or in combination with one or more of the first through nineteenth aspects, the second rule is associated with identification of a first QCL monitoring property and a second QCL monitoring property based at least in part on a down-selection from a set of selection rules. In a twenty-first aspect, alone or in combination with the twentieth aspect, the set of selection rules comprises a first selection rule associated with a specified priority order, a second selection rule associated with identification of the first QCL monitoring property based at least in part on the specified priority order and identification of the second QCL monitoring property based at least in part on identification of the first linked search space set and the second linked search space set, the first linked search space set is associated with the first QCL monitoring property, and a third selection rule associated with a search space set priority rule corresponding to a linkage of at least the first linked search space set and the second linked search space set.

In a twenty-second aspect, alone or in combination with one or more of the first through twenty-first aspects, the first rule is associated with determination of only one respective QCL monitoring property, of the plurality of QCL monitoring properties, corresponding to each of a first CORESET pool index and a second CORESET pool index of the at least one CORESET pool index. In a twenty-third aspect, alone or in combination with one or more of the first through twenty-second aspects, the configuration includes a single-frequency network CORESET configuration, and monitoring the PDCCH communications comprises monitoring in the plurality of the monitored CORESETs. In a twenty-fourth aspect, alone or in combination with the twenty-third aspect, monitoring the PDCCH communications further comprises monitoring in at least one additional CORESET having an associated QCL monitoring property that is also associated with the plurality of the monitored CORESETs.

In a twenty-fifth aspect, alone or in combination with one or more of the twenty-third through twenty-fourth aspects, an application of the third rule or the second rule is based at least in part on whether at least one CORESET of the plurality of overlapping CORESETs includes two associated QCL monitoring properties. In a twenty-sixth aspect, alone or in combination with the twenty-fifth aspect, at least one CORESET of the plurality of overlapping CORESETs includes two associated QCL monitoring properties, and the determination of the plurality of monitored CORESETS is based at least in part on an application of the third rule. In a twenty-seventh aspect, alone or in combination with the twenty-sixth aspect, no CORESET of the plurality of overlapping CORESETs includes two associated QCL monitoring properties, and the determination of the plurality of monitored CORESETs is based at least in part on an application of the second rule.

In a twenty-eighth aspect, alone or in combination with one or more of the twenty-third through twenty-fourth aspects, application of the first rule or the second rule is based at least in part on whether at least one monitoring occasion of the first linked search space set associated with a first CORESET having the first TCI state overlaps with a monitoring occasion of the second linked search space set associated with a second CORESET having the second TCI state. In a twenty-ninth aspect, alone or in combination with one or more of the twenty-third through twenty-fourth aspects, at least one monitoring occasion of the first linked search space set associated with a first CORESET having the first TCI state overlaps with a monitoring occasion of the second linked search space set associated with a second CORESET having the second TCI state, and the determination is based at least in part on an application of the second rule. In a thirtieth aspect, alone or in combination with one or more of the twenty-third through twenty-fourth aspects, no monitoring occasion of the first linked search space set associated with a first CORESET having the first TCI state overlaps with a monitoring occasion of the second linked search space set associated with a second CORESET having the second TCI state, and the determination is based at least in part on an application of the third rule.

In a thirty-first aspect, alone or in combination with one or more of the first through thirtieth aspects, the third rule is associated with an identification of a CORESET of the plurality of overlapping CORESETs based at least in part on exclusion of one or more CORESETs of the plurality of overlapping CORESETs having only one associated QCL monitoring property and application of a PDCCH priority rule to a set of remaining CORESETs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a determination component 708.

In some aspects, the apparatus 700 may be configured to perform one or more operations described herein in connection with FIGS. 4 and 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive a configuration that configures PDCCH repetition and multi-DCI reception wherein, for at least one CORESET pool index, a first monitoring occasion of a first linked search space set, associated with a first CORESET and having a first TCI state, overlaps with a second monitoring occasion of a second linked search space set associated with a second CORESET having a second TCI state, wherein the at least one CORESET pool index comprises at least one of a first CORESET pool index or a second CORESET pool index. The communication manager 140 and/or the reception component 702 may monitor PDCCH communications in a set of overlapping monitoring occasions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of QCL monitoring properties, a second rule associated with the plurality of QCL monitoring properties, or a third rule associated with the plurality of QCL monitoring properties. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 702 and/or the transmission component 704.

The determination component 708 may determine the plurality of QCL monitoring properties. The transmission component 704 may transmit a capability indication that indicates a capability for receiving two QCL properties simultaneously, wherein receiving the configuration comprises receiving the configuration based at least in part on transmitting the capability indication. In some aspects, the determination component 708 may include one or more antennas, a modem, a modulator, a transmit MIMO processor, a transmit processor, a controller/processor, a memory, or a combination thereof, of the UE described in connection with FIG. 2. In some aspects, the determination component 708 may include the reception component 702 and/or the transmission component 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

FIG. 8 is a diagram of an example apparatus 800 for wireless communication. The apparatus 800 may be a TRP, or a TRP may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150.

In some aspects, the apparatus 800 may be configured to perform one or more operations described herein in connection with FIGS. 4 and 5. Additionally, or alternatively, the apparatus 800 may be configured to perform one or more processes described herein. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

In some aspects, the communication manager 150 may facilitate and/or perform any number of communication tasks including, for example, generating configurations (e.g., RRC configurations), allocating resources, managing the operations of the reception component 802 and/or managing the operations of the transmission component 804. In some aspects, the communication manager 150 may include one or more antennas, a modem, a modulator, a transmit MIMO processor, a transmit processor, a controller/processor, a memory, or a combination thereof, of the base station described in connection with FIG. 2. In some aspects, the communication manager 150 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a configuration that configures physical downlink control channel (PDCCH) repetition and multi-downlink control information (DCI) reception wherein, for at least one control resource set (CORESET) pool index, a first monitoring occasion of a first linked search space set, associated with a first CORESET and having a first transmission configuration indicator (TCI) state, overlaps with a second monitoring occasion of a second linked search space set associated with a second CORESET having a second TCI state, wherein the at least one CORESET pool index comprises at least one of a first CORESET pool index or a second CORESET pool index; and monitoring PDCCH communications in a set of overlapping monitoring occasions, that includes the first monitoring occasion and the second monitoring occasion, based at least in part on a determination of a plurality of monitored CORESETs of a set of overlapping CORESETs, wherein the determination of the plurality of monitored CORESETs is based at least in part on a first rule associated with a plurality of quasi co-location (QCL) monitoring properties, a second rule associated with the plurality of QCL monitoring properties, or a third rule associated with the plurality of QCL monitoring properties.

Aspect 2: The method of Aspect 1, further comprising determining the plurality of QCL monitoring properties.

Aspect 3: The method of either of Aspects 1 or 2, further comprising transmitting a capability indication that indicates a capability for receiving two QCL properties simultaneously, wherein receiving the configuration comprises receiving the configuration based at least in part on transmitting the capability indication.

Aspect 4: The method of any of Aspects 1-3, wherein the first monitoring occasion is associated with a first component carrier, and wherein the second monitoring occasion is associated with a second component carrier.

Aspect 5: The method of Aspect 4, wherein the second component carrier is the first component carrier.

Aspect 6: The method of any of Aspects 1-5, wherein application of the first rule or the second rule is based at least in part on whether the set of overlapping CORESETs belong to one CORESET pool index, of the first CORESET pool index and the second CORESET pool index, or to both CORESET pool indexes.

Aspect 7: The method of any of Aspects 1-6, wherein the set of overlapping CORESETs belong to the first CORESET pool index and the second CORESET pool index, and wherein the determination of the plurality of monitored CORESETs is based at least in part on an application of the first rule.

Aspect 8: The method of any of Aspects 1-6, wherein the set of overlapping CORESETs belong to only one of the first CORESET pool index or the second CORESET pool index, and wherein the determination of the plurality of monitored CORESETs is based at least in part on an application of the second rule.

Aspect 9: The method of any of Aspects 1-8, wherein application of the first rule or the second rule is based at least in part on whether at least one monitoring occasion of the first linked search space set associated with the first CORESET having the first TCI state overlaps with a monitoring occasion of the second linked search space set associated with the second CORESET having the second TCI state.

Aspect 10: The method of any of Aspects 1-9, wherein at least one monitoring occasion of the first linked search space set associated with the first CORESET having the first TCI state overlaps with a monitoring occasion of the second linked search space set associated with the second CORESET having the second TCI state, and wherein the determination of the plurality of monitored CORESETs is based at least in part on an application of the second rule.

Aspect 11: The method of any of Aspects 1-9, wherein no monitoring occasion of the first linked search space set associated with the first CORESET having the first TCI state overlaps with a monitoring occasion of the second linked search space set associated with the second CORESET having the second TCI state, and wherein the determination of the plurality of monitored CORESETs is based at least in part on an application of the first rule.

Aspect 12: The method of any of Aspects 1-10, wherein the determination is based at least in part on the second rule, the method further comprising: determining the first CORESET, of the set of overlapping CORESETs, that is associated with the first CORESET pool index; and determining the second CORESET, of the plurality of overlapping CORESETs, that is associated with the first CORESET pool index, wherein monitoring the PDCCH communications comprises monitoring in at least one of the first CORESET, the second CORESET, or an additional CORESET having at least one QCL monitoring property in common with the first CORESET and the second CORESET.

Aspect 13: The method of Aspect 12, wherein determining the first CORESET comprises applying the second rule, and wherein determining the second CORESET comprises applying the second rule.

Aspect 14: The method of Aspect 12, wherein determining the first CORESET comprises applying the first rule, and wherein determining the second CORESET comprises applying the first rule.

Aspect 15: The method of any of Aspects 1-14, wherein the first rule is associated with determination of only one respective QCL monitoring property, of the plurality of QCL monitoring properties, corresponding to each of the first CORESET pool index and the second CORESET pool index of the at least one CORESET pool index, wherein the determination of the only one respective QCL monitoring property is based at least in part on at least one decision factor of a plurality of decision factors, and wherein the at least one decision factor is based at least in part on a priority rule.

Aspect 16: The method of Aspect 15, wherein the plurality of decision factors comprises: a first decision factor that indicates selection of the one respective QCL monitoring property based at least in part on a linkage between the first linked search space set and the second linked search space set, a second decision factor that indicates selection of the one respective QCL monitoring property based at least in part on an association with at least one of a common search space or a UE-specific search space, a third decision factor that indicates selection of the one respective QCL monitoring property based at least in part on a lowest component carrier index of a plurality of component carrier indexes, and a fourth decision factor that indicates selection of the one respective QCL monitoring property based at least in part on a lowest search space set index of a plurality of search space set indexes.

Aspect 17: The method of Aspect 16, wherein the priority rule indicates that: the first decision factor has a higher priority than the second decision factor, the second decision factor has a higher priority than the third decision factor, and the third decision factor has a higher priority than the fourth decision factor.

Aspect 18: The method of Aspect 16, wherein the priority rule indicates that: the second decision factor has a higher priority than the first decision factor, the first decision factor has a higher priority than the third decision factor, and the third decision factor has a higher priority than the fourth decision factor.

Aspect 19: The method of Aspect 16, wherein the priority rule indicates that: the second decision factor has a higher priority than the third decision factor, the third decision factor has a higher priority than the first decision factor, and the first decision factor has a higher priority than the fourth decision factor.

Aspect 20: The method of Aspect 16, wherein the priority rule indicates that: the second decision factor has a higher priority than the third decision factor, the third decision factor has a higher priority than the fourth decision factor, and the fourth decision factor has a higher priority than the first decision factor.

Aspect 21: The method of any of Aspects 1-20, wherein the second rule is associated with identification of a first QCL monitoring property and a second QCL monitoring property based at least in part on a down-selection from a set of selection rules.

Aspect 22: The method of Aspect 21, wherein the set of selection rules comprises: a first selection rule associated with a specified priority order, a second selection rule associated with identification of the first QCL monitoring property based at least in part on the specified priority order and identification of the second QCL monitoring property based at least in part on identification of the first linked search space set and the second linked search space set, wherein the first linked search space set is associated with the first QCL monitoring property, and a third selection rule associated with a search space set priority rule corresponding to a linkage of at least the first linked search space set and the second linked search space set.

Aspect 23: The method of any of Aspects 1-22, wherein the first rule is associated with determination of only one respective QCL monitoring property, of the plurality of QCL monitoring properties, corresponding to each of a first CORESET pool index and a second CORESET pool index of the at least one CORESET pool index.

Aspect 24: The method of any of Aspects 1-23, wherein the configuration includes a single-frequency network CORESET configuration, wherein monitoring the PDCCH communications comprises monitoring in the plurality of the monitored CORESETs.

Aspect 25: The method of Aspect 24, wherein monitoring the PDCCH communications further comprises monitoring in at least one additional CORESET having an associated QCL monitoring property that is also associated with the plurality of the monitored CORESETs.

Aspect 26: The method of either of Aspects 24 or 25, wherein an application of the third rule or the second rule is based at least in part on whether at least one CORESET of the plurality of overlapping CORESETs includes two associated QCL monitoring properties.

Aspect 27: The method of Aspect 26, wherein at least one CORESET of the plurality of overlapping CORESETs includes two associated QCL monitoring properties, and wherein the determination of the plurality of monitored CORESETS is based at least in part on an application of the third rule.

Aspect 28: The method of Aspect 27, wherein no CORESET of the plurality of overlapping CORESETs includes two associated QCL monitoring properties, and wherein the determination of the plurality of monitored CORESETs is based at least in part on an application of the second rule.

Aspect 29: The method of either of Aspects 24 or 25, wherein application of the first rule or the second rule is based at least in part on whether at least one monitoring occasion of the first linked search space set associated with the first CORESET having the first TCI state overlaps with a monitoring occasion of the second linked search space set associated with the second CORESET having the second TCI state.

Aspect 30: The method of either of Aspects 24 or 25, wherein at least one monitoring occasion of the first linked search space set associated with the first CORESET having the first TCI state overlaps with a monitoring occasion of the second linked search space set associated with the second CORESET having the second TCI state, and wherein the determination is based at least in part on an application of the second rule.

Aspect 31: The method of either of Aspects 24 or 25, wherein no monitoring occasion of the first linked search space set associated with the first CORESET having the first TCI state overlaps with a monitoring occasion of the second linked search space set associated with the second CORESET having the second TCI state, and wherein the determination is based at least in part on an application of the third rule.

Aspect 32: The method of any of Aspects 1-31, wherein the third rule is associated with an identification of a CORESET of the plurality of overlapping CORESETs based at least in part on exclusion of one or more CORESETs of the plurality of overlapping CORESETs having only one associated QCL monitoring property and application of a PDCCH priority rule to a set of remaining CORESETs.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, wherein the one or more processors are configured to:
      receive a configuration that configures physical downlink control channel (PDCCH) repetition and multiple downlink control information (multi-DCI) reception wherein, for a first control resource set (CORESET) pool index and a second CORESET pool index, a first monitoring occasion of a first linked search space set, associated with a first CORESET and having a first transmission configuration indicator (TCI) state, overlaps with a second monitoring occasion of a second linked search space set associated with a second CORESET having a second TCI state; and
      monitor PDCCH communications in a set of overlapping monitoring occasions, that includes the first monitoring occasion and the second monitoring occasion, based on a determination of a plurality of monitored CORESETs of a set of overlapping CORESETs, wherein:
         the determination of the plurality of monitored CORESETs is based on a rule associated with a plurality of quasi co-location (QCL) monitoring properties;
         the rule is associated with determination of a respective QCL monitoring property, of the plurality of QCL monitoring properties, corresponding to each of the first CORESET pool index and the second CORESET pool index;
         the determination of the respective QCL monitoring property is based on at least one decision factor of a plurality of decision factors.

2. The UE of claim 1, wherein the one or more processors are further configured to determine the plurality of QCL monitoring properties.

3. The UE of claim 1, wherein the one or more processors are further configured to transmit a capability indication that indicates a capability for receiving two QCL properties simultaneously, and wherein the one or more processors, to receive the configuration, are configured to receive the configuration based on transmitting the capability indication.

4. The UE of claim 1, wherein the first monitoring occasion is associated with a first component carrier and the second monitoring occasion is associated with a second component carrier.

5. The UE of claim 1, wherein application of the rule is based on whether the set of overlapping CORESETs belong to one CORESET pool index, of the first CORESET pool index and the second CORESET pool index, or to both of the first and second CORESET pool indexes.

6. The UE of claim 1, wherein the set of overlapping CORESETs belong to the first CORESET pool index and the second CORESET pool index, and wherein the determination of the plurality of monitored CORESETs is based on an application of the rule.

7. The UE of claim 1, wherein the set of overlapping CORESETs belong to only one of the first CORESET pool index or the second CORESET pool index, and wherein the determination of the plurality of monitored CORESETs is based on an application of the rule.

8. The UE of claim 1, wherein at least one monitoring occasion of the first linked search space set associated with a first CORESET having the first TCI state overlaps with a monitoring occasion of the second linked search space set associated with a second CORESET having the second TCI state, and wherein the determination of the plurality of monitored CORESETs is based on an application of the rule.

9. The UE of claim 1, wherein no monitoring occasion of the first linked search space set associated with a first CORESET having the first TCI state overlaps with a monitoring occasion of the second linked search space set associated with a second CORESET having the second TCI state, and wherein the determination of the plurality of monitored CORESETs is based on an application of the rule.

10. The UE of claim 1, wherein the one or more processors are further configured to:
    determine a first CORESET, of the set of overlapping CORESETs, that is associated with the first CORESET pool index; and
    determine a second CORESET, of the plurality of overlapping CORESETs, that is associated with the first CORESET pool index,
        wherein the one or more processors, to monitor the PDCCH communications, are configured to monitor in at least one of the first CORESET, the second CORESET, or an additional CORESET having at least one QCL monitoring property in common with the first CORESET and the second CORESET.

11. The UE of claim 10, wherein the one or more processors, to determine the first CORESET, are configured to apply the rule, and wherein the one or more processors, to determine the second CORESET, are configured to apply the rule.

12. The UE of claim 10, wherein the rule is a first rule, and wherein the one or more processors, to determine the first CORESET, are configured to apply a second rule, and wherein the one or more processors, to determine the second CORESET, are configured to apply a second rule.

13. The UE of claim 1, wherein the plurality of decision factors comprises:
    a first decision factor that indicates selection of the respective QCL monitoring property based on a linkage between the first linked search space set and the second linked search space set,
    a second decision factor that indicates selection of the respective QCL monitoring property based on an association with at least one of a common search space or a UE-specific search space,
    a third decision factor that indicates selection of the respective QCL monitoring property based on a lowest component carrier index of a plurality of component carrier indexes, and
    a fourth decision factor that indicates selection of the respective QCL monitoring property based on a lowest search space set index of a plurality of search space set indexes.

14. The UE of claim 13, wherein the priority rule indicates that:
    the first decision factor has a higher priority than the second decision factor,
    the second decision factor has a higher priority than the third decision factor, and
    the third decision factor has a higher priority than the fourth decision factor.

15. The UE of claim 13, wherein:
    the second decision factor has a higher priority than the first decision factor,
    the first decision factor has a higher priority than the third decision factor, and
    the third decision factor has a higher priority than the fourth decision factor.

16. The UE of claim 13, wherein:
    the second decision factor has a higher priority than the third decision factor,
    the third decision factor has a higher priority than the first decision factor, and
    the first decision factor has a higher priority than the fourth decision factor.

17. The UE of claim 13, wherein:
    the second decision factor has a higher priority than the third decision factor,
    the third decision factor has a higher priority than the fourth decision factor, and
    the fourth decision factor has a higher priority than the first decision factor.

18. The UE of claim 1, wherein the rule is associated with identification of a first QCL monitoring property and a second QCL monitoring property based on a down-selection from a set of selection rules.

19. The UE of claim 18, wherein the set of selection rules comprises:
    a first selection rule associated with a specified priority order,
    a second selection rule associated with identification of the first QCL monitoring property based on the specified priority order and identification of the second QCL monitoring property based on identification of the first linked search space set and the second linked search space set, wherein the first linked search space set is associated with the first QCL monitoring property and the second linked search space set is associated with the second QCL monitoring property, and
    a third selection rule associated with a search space set priority rule corresponding to a linkage of at least the first linked search space set and the second linked search space set.

20. The UE of claim 1, wherein the rule is associated with determination of only one respective QCL monitoring property, of the plurality of QCL monitoring properties, corresponding to each of the first CORESET pool index and the second CORESET pool index.

21. The UE of claim 1, wherein the configuration includes a single-frequency network CORESET configuration, and wherein the one or more processors, to monitor the PDCCH communications, are configured to monitor in the plurality of the monitored CORESETs.

22. The UE of claim 21, wherein the one or more processors, to monitor the PDCCH communications, are configured to monitor in at least one additional CORESET having an associated QCL monitoring property that is also associated with the plurality of the monitored CORESETs.

23. The UE of claim 21, wherein an application of the rule is based on whether at least one CORESET of the plurality of overlapping CORESETs includes two associated QCL monitoring properties.

24. The UE of claim 23, wherein at least one CORESET of the plurality of overlapping CORESETs includes two associated QCL monitoring properties, and wherein the determination of the plurality of monitored CORESETS is based on an application of the rule.

25. The UE of claim 24, wherein no CORESET of the plurality of overlapping CORESETs includes two associated QCL monitoring properties, and wherein the determination of the plurality of monitored CORESETs is based on an application of the second rule.

26. The UE of claim 21, wherein application of the rule is based on whether at least one monitoring occasion of the first linked search space set associated with a first CORE- SET having the first TCI state overlaps with a monitoring occasion of the second linked search space set associated with a second CORESET having the second TCI state.

27. The UE of claim 21, wherein at least one monitoring occasion of the first linked search space set associated with a first CORESET having the first TCI state overlaps with a monitoring occasion of the second linked search space set associated with a second CORESET having the second TCI state, and wherein the determination is based on an application of the rule.

28. The UE of claim 21, wherein no monitoring occasion of the first linked search space set associated with a first CORESET having the first TCI state overlaps with a monitoring occasion of the second linked search space set associated with a second CORESET having the second TCI state, and wherein the determination is based on an application of the rule.

29. The UE of claim 1, wherein the rule is associated with an identification of a CORESET of the plurality of overlapping CORESETs based on exclusion of one or more CORESETs of the plurality of overlapping CORESETs having only one associated QCL monitoring property and application of a PDCCH priority rule to a set of remaining CORESETs.

30. The UE of claim 1, wherein the at least one decision factor is based on a priority rule.

\* \* \* \* \*